United States Patent [19]

Tomala

[11] Patent Number: 4,824,181
[45] Date of Patent: Apr. 25, 1989

[54] PRESSURE ACTIVATED ISOLATION VALVE

[75] Inventor: Ambrose Tomala, Royal Oak, Mich.

[73] Assignee: Allied-Signal Inc., Morris Township, Morris County, N.J.

[21] Appl. No.: 88,171

[22] Filed: Aug. 21, 1987

[51] Int. Cl.[4] .......................... B60T 15/36; B60T 8/48
[52] U.S. Cl. .................................. 303/84.2; 303/113; 303/115; 60/563; 60/565; 91/33; 137/625.66; 137/901
[58] Field of Search .................. 137/625.65, 625.66, 137/901, 596.17; 60/560, 563, 565, 566; 91/33; 188/151 A; 303/6 R, 6 A, 52, 54, 84 R, 84 A, 113, 114, 115, 116, 119, 6.01, 9.61, 84.1, 84.2

[56] References Cited

U.S. PATENT DOCUMENTS

| | | | |
|---|---|---|---|
| 3,423,136 | 1/1969 | LohBauer | 303/54 |
| 4,036,534 | 7/1977 | Kondo et al. | 303/115 X |
| 4,685,749 | 8/1987 | Otsuki et al. | 303/84 A X |
| 4,694,862 | 9/1987 | Rott | 137/901 X |

FOREIGN PATENT DOCUMENTS 2008701  6/1978  United Kingdom ............... 303/115

Primary Examiner—Andres Kashnikow
Assistant Examiner—Timothy Newholm
Attorney, Agent, or Firm—Markell Seitzman

[57] ABSTRACT

An iosolation valve usable with an adaptive braking/traction control system comprising a plurality of passages adapted to communicate to a variety of pressure sources and an outlet port adapted to communicate to at least one brake cylinder. A valve movable to open and close one or the other of opposingly situated first and second passages to alternately communicate a master cylinder to the outlet port or a second pressure source to the outlet port so that when the first passage is closed by the valve the brake master cylinder is isolated from the brake cylinder.

14 Claims, 3 Drawing Sheets

PRESSURE ACTIVATED ISOLATION VALVE

BACKGROUND AND SUMMARY OF INVENTION

The present invention is generally related to a pressure activated isolation valve for use in anti-lock/traction control braking systems.

In many instances it is considered desirable to isolate the brake pedal from the operation of the anti-lock and/or traction control system. This isolation is desirable so that these systems do not interfere with normal brake pedal operation. As an example it is undesirable for an anti lock system to feed back to the brake pedal to cause it to move from the position established by the operator. Similarly it is undesirable for a traction control system to activate the brakes of the non-driven wheels. As such, it is desirable to incorporate into such systems an isolation valve. Prior systems have suggested using solenoid valves to isolate the anti lock system from the brake pedal and/or from the master cylinder. Without such isolation the vehicle operator may become distracted at inopportune moments due to unexpected movement of the brake pedal. However, the inclusion of the solenoid valves and associated wiring to accomplish the isolation function increases cost, and may lower the overall reliability of the system.

It is a purpose of the present invention to provide means which obviates the need for solenoid valves to achieve the desired isolation of the master cylinder from the remainder of the anti-lock/traction braking system. Another purpose of the present invention is to provide an anti-lock/traction braking system which uses pressure activated isolation valves. A further purpose of the present invention is to provide means for automatically preventing the operation of the isolation valve(s) if adequate pressure is not available for reapplication of brake force (after release) during anti-lock system operation. An additional purpose of the present invention is to utilize many of components of an anti-lock system to control tractive effort. Accordingly the invention comprises: a pressure responsive isolation valve for use within an adaptive braking system comprising: passage means including a first port adapted to receive pressurized fluid from a first pressure source, an outlet port adapted to communicate with various brake cylinders, a second port adapted to communicate fluid to or from control valves; and a pressure port remote from the other ports, adapted to receive pressured fluid from a second pressurized source. The isolation valve further includes: valve means movable to open and close one or another of opposingly situated passages and to alternatively communicate the first port to the outlet port or the second port to the outlet port; means for moving the valve means relative to the passages, including first means movable in response to pressurized fluid from the second source for urging the valve means to seat upon the first passage to control communication to and from the first source to the output port.

Many other objects and purposes of the invention will be clear from the following detailed description of the drawings.

DETAILED DESCRIPTION OF THE DRAWINGS

Figure 1:
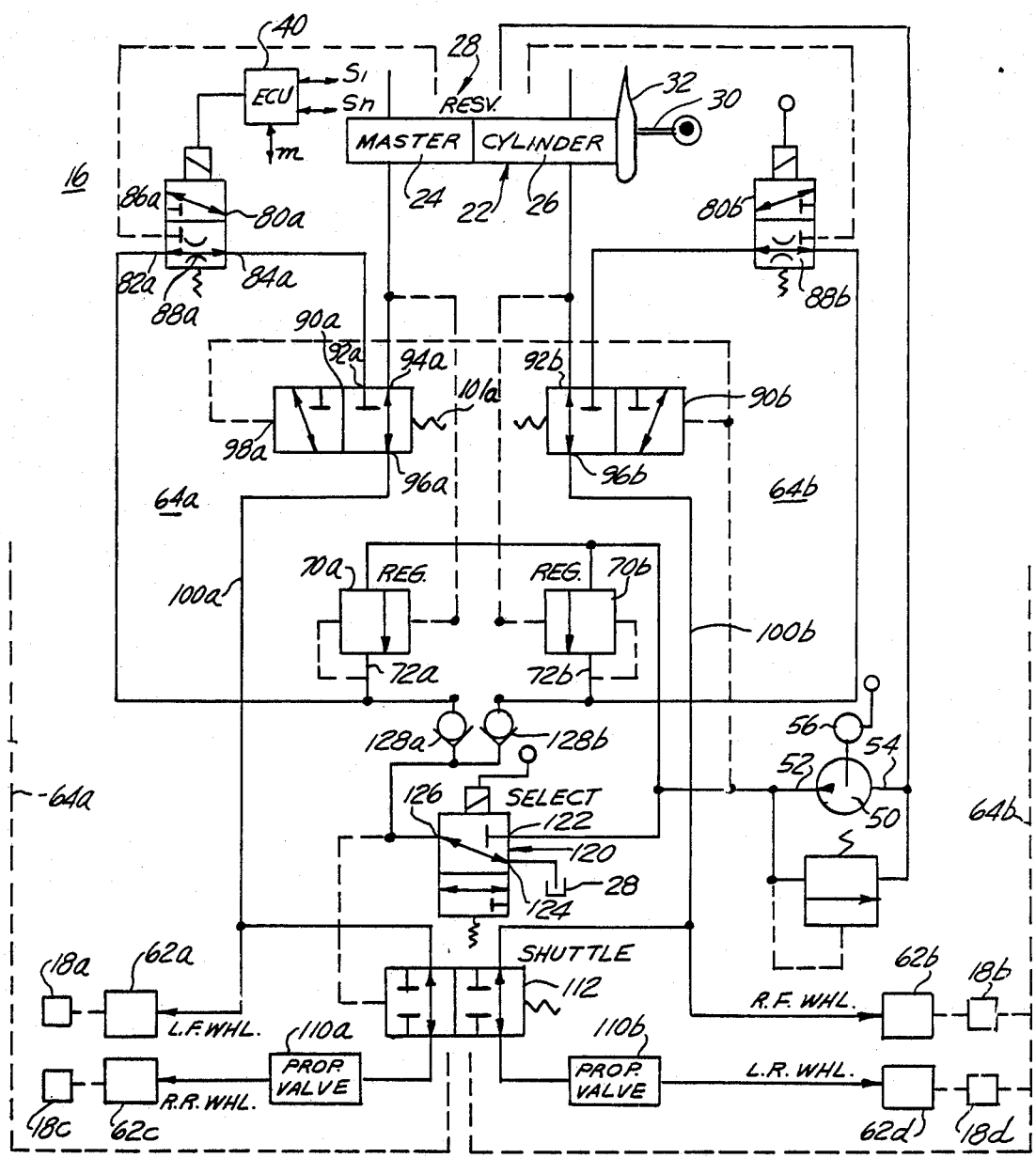
FIG. 1 schematically represents a two channel three solenoid anti-skid system which optionally includes traction control.

FIG. 1 illustrates a two-channel, three solenoid anti-skid/traction control braking system 16 for controlling the motion of the various wheels 18 of a vehicle. The system 16 comprises first means for increasing the brake fluid pressure in response to operator demand. Such first means may include a master cylinder 22 having respective pressure chambers 24 and 26 each of which are communicated to a fluid reservoir 28. A drive link 30 is attached to the brake pedal (not shown) in a known manner. As illustrated in FIG. 1 the master cylinder 22 may be activated by a power assist mechanism such as a vaccuum power booster which is schematically shown as 32.

The system 16 further includes an electronic control unit (ECU), generally designated as 40, responsive to signals ($S_1$–$S_n$) indicative of the rotational state of each wheel 18. A pump 50 is used to provide additional brake fluid under pressure and includes an output 52 and an input 54. As illustrated in FIG. 1 the pump is driven by an electric motor 56 in response to a control signal generated by the ECU 40.

The system further includes brake means, responsive to fluid pressure for slowing the rotation of selective wheels 18. As illustrated, the system includes a plurality of brake cylinders 62a–d one each associated with each wheel 18a–d. As it is known in the art these brake cylinders form part of typical disc brakes or foundation brakes. Associated with each of the wheels is a wheel speed sensor and tone wheel for generating a series of pulses indicative of the rotational speed of particular wheel. Such wheel speed senors and tone wheels are not illustrated in FIG. 1 since such devices are standard in the art of adaptive or anti-lock braking systems. For convenience of description the braking means is divided into two substantially identical braking channels 64a and b. As illustrated in FIG. 1 the braking channel 64a and b are split braking channels. As an example, braking channel 64a may comprise one front wheel brake cylinder 62a and a diagonally situated rear wheel brake cylinder 62c. The braking channel 64b includes the remaining brake cylinders 62b and d. It should be appreciated that each braking channel includes the corresponding tone wheels and sensors for each of the respective wheels. Obviously, other splits between the brake cylinders can be used such as a front-to-rear split.

The output 52 of the pump 50 is communicated to separate regulator means 70a and 70b, one for each brake channel 64a and 64b. As illustrated, such regulators 70a and b are of the differential pressure regulator type responsive to the pressure level established by the pump 50 as well as to the pressure level established by the respective chambers 24 and 26 of the master cylinder 22. The purpose of the differential pressure regulators is to maintain the pressure at their respective outputs 72a and 72b at approximately the pressure level within the chambers of the master cylinder as established by the operator. The system can also be configured with a single regulator.

A first valve, such as solenoid valve 80a, responsive to a control signal generated by the ECU 40, is located in fluid communication with the output 72a of the first pressure regulator 70a. The first solenoid valve 80a includes a first port 82a, second port 84a and a third port 86a. In the absence of a control signal received from the ECU 40 the first and second ports 82a and 84a respectively, are communicated to each other through a control orifice 88a. The second port 84a is communicated to a first port 92a (part of an alternate flow path) of a first pressure responsive isolation valve 90a. The third port 86a of the solenoid valve 80a is communicated to the reservoir 28. When in receipt of a control signal from the ECU 40 the internal valving of the first solenoid valve communicates the second port 84a to the third port 86a. As mentioned above, the isolation valve 90a is a pressure responsive valve and more particularly, is responsive to the pressure level established by the pump 50 which is received at port 98a. The isolation valve further includes ports 94a and 96a. Port 94a is communicated to one of the chambers, such as chamber 24 in the master cylinder 22 and port 96a is communicated through a brake line 100a to the brake cylinders within the first braking channel 64a. The isolation valve 90a further includes a bias spring 101a for biasing the isolation valve 90a against the fluid pressure established by the pump 50. When the fluid pressure of the pump 50 is below a first pressure level the isolation valve will be in a condition as shown in FIG. 1 wherein the master cylinder chamber 24 is communicated directly to the brake cylinders in the first braking channel 64a through ports 94a and 96a respectively. As described below, the pressure generated by the pump 50 will increase as the motor 56 turns in response to a control signal generated by the ECU 40. As the pressure level increases the isolation valve is moved such that the ports 92a and 96a are placed in direct communication thereby isolating the master cylinder chamber 24 from the remainder of the braking system and permitting fluid at the output 72a of pressure regulator 70a to be communicated through the solenoid valve 80a to the braking channel 64a. The isolation valve 90a is shown in greater detail in FIG. 3.

The system further includes a second valve, such as solenoid valve 80b, responsive to control signals generated from the ECU 40, an isolation valve 90b communicated with the pump in a like manner as previously described for isolation valve 90a and regulator 70a. The pump 50, solenoid valve 80b, isolation valve 90b and pressure regulator 70b are connected to and through the second braking channel 64b in a manner identical with that described above with the exception that the isolation valve 90b is connected to the second chamber 26 of the master cylinder 22.

Each brake channel 64a and 64b typically includes a proportioning valve 110a and 110b respectively, for the rear vehicle wheels 18c and d. The proportioning valves are communicated to the brake lines 100a and 100b through a shuttle valve 112. The shuttle valve is a pressure responsive valve having two modes of operation. The first mode of operation, permits direct communication of the proportioning valves 110 to the brake lines 100. The second mode of operation is entered into in response to an increased pump pressure and terminates communication between the proportioning valves and the brake lines. Pressure is communicated to the shuttle valve 112 from the pump 50 through a third valve such as an electrically responsive third solenoid valve 120. The solenoid valve 120 includes ports 122, 124 and 126. The port 126 is communicated to the outputs 72 of the pressure regulators 70a and 70b through a like plurality of check valves 128a and 128b. The purpose of the shuttle valve 112, solenoid valve 120 and check valves 128 is primarily to permit the incorporation of a traction control feature in the present invention. It should be recognized that by eliminating the shuttle valve, the third solenoid valve, and the check valves from the system the remaining structure defines a two solenoid, two channel anti-skid/braking system.

FIG. 1 illustrates the condition of the system during normal braking operations with the traction control portion of the system deactivated. Under normal braking conditions brake pressure from the master cylinder 22 is communicated through the isolation valves 90a and 90b to the appropriate braking channels 64a and 64b. In this mode of operation the performance of the system is characterized by normal braking. During the normal braking performance of the vehicle the ECU 40 monitors the output of the wheel speed sensors (not shown) corresponding to each of the wheels 18 of the vehicle. In response to the signals from the sensors and to a brake switch signal (m), indicative that the brake pedal has been applied by the operator, the ECU determines whether or not one or more of the wheels of the vehicle are skidding or are approaching an impending wheel skid situation. "Skidding" and "impending" skid are used synonymously. Upon the application of the brakes the ECU 40 generates a signal indicative of average deceleration of the various wheels. When the average deceleration increases to a predetermined value, such value being indicative of impending or actual skid the ECU generates control functions to thereby decay and/or build the pressure within the brake cylinder for the skidding wheel. If such condition occurs the ECU additionally provides a signal to activate pump 50. Very quickly after start up of the pump the pressure at the pump outlet 52 will raise to a sufficiently high level to overcome the spring bias on the isolation valves 90a and 90b. For the present example it is assumed that one of the wheels in the channel 64a has been detected as skidding. The isolation valves change their state in response to the supplied pressure from the pump 50 such that ports 96a and 96b are communicated to ports 92a and 92b respectively. In essence, this change in the operational state of the isolation valves 90a and 90b isolates the master cylinder from the remaining portion of the system and maintains the pressure within the master cylinder 22 to a value sufficiently high that the operator of the vehicle senses that full brake pressure is still being supplied to brake cylinders 62a–d. With regard to the non-skidding wheels of braking channel 64b, it is desired that normal braking continue for these wheels This is accomplished by controlling the brake cylinders 62b and 62d through the brake pressure developed at the output of pressure regulator 70b. As previously mentioned, the pressure regulator 70b is a differential pressure regulator and consequently its output pressure, at port 72b, will be substantially equal to the value of fluid pressure within the master cylinder chamber 26. Such pressure is communicated to braking channel 64b through orifice 88b within solenoid valve 80b via the isolation valve 90b.

With regard to the control of the braking channel 64a, which includes the skidding wheel(s), and as mentioned above, the ECU generates a control (decay) signal to the first solenoid valve 80a causing same to change its state thereby communicating the first isolation valve 90a to the reservoir via ports 84a and 86a. It should be apparent from the above that by communicating the various brake cylinders, within braking channel 64a to the reservoir 28, through the isolation valve 90a and solenoid valve 80a the brake pressure within the brake cylinders 62a and 62c is permitted to decrease. During this mode of operation the ECU 40 continually monitors the rotational state of the wheels and when it senses that the acceleration of the locked or skidding wheel is zero or positive (indicating that the wheel has begun or is just about to rotate) the ECU 40 removes the control signal (which causes solenoid valve 80a to change state) thereby reestablishing communication between ports 82a and 84a. In this mode of operation the fluid pressure established at the output of the differential pressure regulator 72a is communicated to the brake cylinders within braking channel 64a through the isolation valve 90a and through the orifice 88a within the solenoid valve 80a. The orifice 88a reduces the rate of the pressure rise to the skidding wheel(s) to avoid immediate and premature wheel lock-up. As the regulated pressure supplied to the brake cylinders in the braking channel 64a continues to rise, the ECU 40 monitors the rotational state of the wheels to determine if the re-applied pressure has again caused the wheel to reenter the locked condition whereupon the control signal to solenoid valve 80a is applied thereby dumping or relieving the brake pressure to the reservoir, permitting the locked wheel to again reaccelerate. Thereafter, the control signal is again removed and pressure is supplied to the brake cylinders through the orifice 88a. The above conditions are continued until the wheel skid condition has terminated and the ECU 40 removes the control signal to the pump 50 which causes both of the isolation valves 90 to assume their normal non-anti-lock position and reestablishes normal brake control between the master cylinder and the various wheel cylinders.

The following is a description of the operation of the traction control portion of the system described in FIG. 1. The traction control portion is operated independently of the anti-skid portion of the system. The purpose of traction control is to maintain the difference in the rotational velocities of the driven wheels at a predetermined level. The operation of the traction control system is best understood by the following example where it is assumed that the vehicle is at rest having one of the driven wheels on a low coefficient of friction surface. Typically in response to increases in the engine throttle, all of the engine power is communicated to the wheel on the lowest coefficient surface, as such, such wheel uncontrollably rotates, providing less than desired vehicle motion. Typically, the driven wheels are supplied torque through a differential. The differential always provides equal torque to each wheel (except for friction or inertial effects). Therefore, the torque transmitted to the slower wheel is limited to the torque transmitted to the wheel on the lowest coefficient surface. As mentioned above, in response to increased throttle the vehicle will still not move and only engine speed increases. Applying the brake to the spinning wheel will slow the spinning wheel thereby increasing the torque transmitted through the differential to the other wheel. The traction control system is activated when the brakes are not manually applied A signal indicative of the condition of the brakes may be obtained in a normal manner from a brake switch of a known variety. During such no-brake condition the ECU compares the rotational velocity of the driven wheels. As an example, in a front wheel drive vehicle the ECU 40 will compare the rotational velocities of each of the front wheels. Upon determining that a difference in velocity exists which exceeds a predetermined minimum, the ECU generates a control signal to the pump 50. The increased pressure from the pump 50 is communicated to the isolation valves 90a and 90b causing them to change state. The pump is also communicated to a third or traction solenoid valve 120. As can be seen, the output port 126 of solenoid valve 120 is communicated to the shuttle valve 112 as well as to the check valves 128a and 128b. During the above described anti-skid operation of the vehicle, that is with solenoid valve 120 deactivated, the output port 126 is communicated to the reservoir 28. This communication causes a pressure differential across the check valves 128a, 128b thereby isolating the traction control system from the anti-skid portion of the system. In response to a control signal generated by the ECU 40, the solenoid valve 120 is caused to change state thereby communicating its ports 122 and 126 to permit the fluid pressure generated by the pump 50 to cause the shuttle valve 112 to change its state to a no-flow condition. As can be seen from FIG. 1 the shuttle valve 112 has two states. The first operational state, illustrated in FIG. 1, is active during the anti-skid mode of operation wherein brake fluid is permitted to flow through the proportioning valves 110 to the various wheel cylinders. In the second mode of operation, that is, the mode active during traction control, brake fluid communication is terminated to the non-driven wheels which, upon reflection, is desirable since the purpose of the traction control system is to enable the vehicle to move forward and as such, if undesired brake application occurs the purpose of the traction control system is defeated. During instances when the solenoid valve 120 is activated the output of the pump 50 is also communicated through the check valves 128a and 128b to the wheel cylinders 62a and 62b through the orifices 88a and 88b in solenoid valves 80a and 80b. To prevent brake pressure to the non-spinning driven wheel its solenoid valve 80a or 80b, as the case may be, will also be actuated to prevent brake application.

More specifically, the ECU 40 causes the solenoid valve, such as solenoid valve 80a corresponding to the lower rotating non-spinning driven wheel to change state thereby communicating its port 84a to the reservoir through port 86a. This action effectively prohibits braking fluid from being communicated to this low velocity wheel. With regard to the control of the higher rotating wheel no additional control signals are necessary since with the solenoid valve 80b in its non-activated condition the fluid from the pump 50 is communicated through check valve 128b to the wheel cylinder 62b through the orifice 88b and isolation valve 90b. This action causes the activation of the wheel cylinder thereby braking or reducing the rotational motion of the skidding wheel. The benefit of utilizing the orifice 88b within solenoid valve 80b prohibits an abrupt change in brake pressure thereby avoiding a premature lock-up of the high speed wheel. As mentioned above, by slowing the spinning wheel engine torque is transmitted to the other driven wheel.

Figure 2:
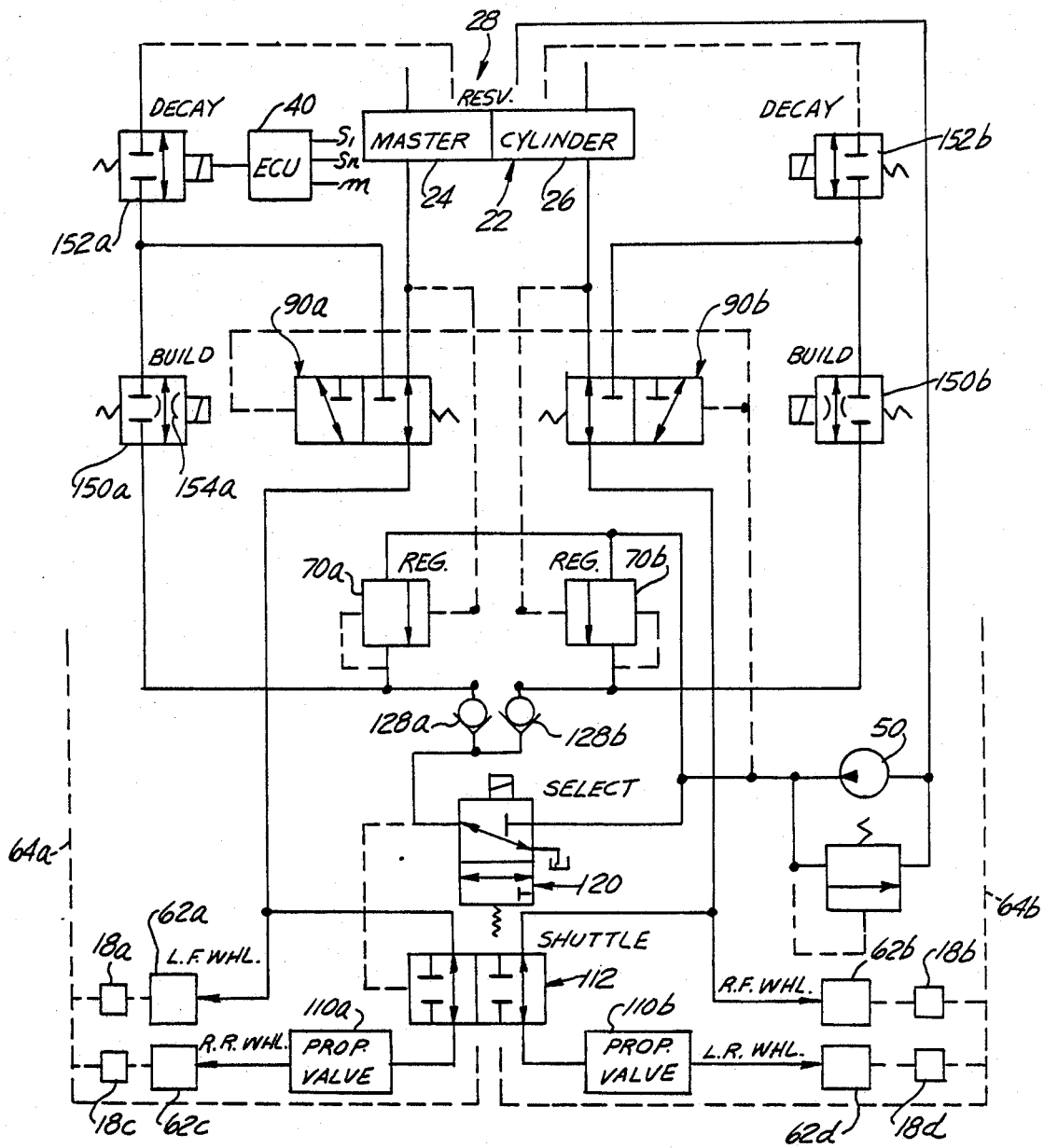
FIG. 2 shows an alternate two channel system.

It should be apparent from the above that the antilock system described in FIG. 1 modulates the brake pressure to the skidding wheel so that the brake pressure is either building or decaying under the control of the respective solenoid valves 80a and 80b. The system described in FIG. 2 illustrates an alternate two channel, anti-skid/traction control system. As may be recalled from the discussion of the system of FIG. 1 after the brake pressure of the skidding wheel has been lowered to a level wherein the wheel deceleration has been reduced to zero or alternatively the acceleration increases (which is indicative of the fact that the wheel has begun to rotate and hence is no longer skidding) the ECU 40 causes solenoids 80 to reapply the brake pressure through the various orifices 88. In certain instances, it is desirable not to immediately increase the brake pressure to the previously skidding wheel after it has begun to reaccelerate. This is accomplished by adding an additional feature to the system which allows the brake pressure to be held at a fairly constant value to permits the previously skidding wheel to reaccelerate. The anti-skid/traction control system of FIG. 2 has many of the components illustrated in FIG. 1. It should be noted that like components are shown with the same numeral used in FIG. 1. In the system of FIG. 2 the solenoid valves 80a and 80b are each replaced by two sets of solenoid valves, 150a and 152a and 150b and 152b. One of the purposes of the solenoid valves 150a and 150b is to permit the reapplication of brake pressure to the skidding wheel's brake cylinder and as such they are also referred to as build valves or build solenoids. One of the functions of the solenoids 152a and 152b is to permit pressure in the various wheel cylinders to decay and similarly these solenoids 152 are also referred to as decay valves or decay solenoids. In addition, the solenoids 150a, 152a, 150b and 152b cooperate to fix or maintain the brake pressure to the previously skidding wheel and in concert these pairs of solenoid valves cooperate to perform a hold function. Each of the solenoid valves 150 and 152 is shown schematically and includes two operational modes, a closed mode and an open mode which respectively permits or prohibits fluid flow therethrough. As shown in FIG. 2, the solenoid valves 150 and 152 are normally closed (no flow). The initial functional operation system of FIG. 2 is substantially identical to the initial operation of the system described in FIG. 1, that is, upon the application of the brakes the ECU 40 generates a deceleration signal indicative of the rotational state of the various wheels. When such deceleration increases to a predetermined value, such value being indicative of impending or actual skid the ECU generates a plurality of control functions to thereby decay, hold and build the pressure within the brake cylinder for the skidding wheel. As an example, it is again assumed that one of the wheels in the braking channel 64a is skidding or at an impending skid situation. The pump 50 is activated as described above thereby causing the isolation valves 90a and 90b to change their respective operational states In order to correct the skidding condition the ECU 40 generates a signal to the decay valve 152a, which was previously closed (no flow), causing it to change state thereby providing a flow path from the skidding wheel's brake cylinder to the reservoir 28, in order to reduce the brake pressure in the wheel brake cylinder The ECU thereafter monitors the rotational state of the previously skidding wheel to determine when that wheel's acceleration is zero or positive. At this point in time the control signal is removed and the decay valve 152a closed (no flow) to prohibit a further decrease in brake pressure. Upon closing (no flow) the decay valve 152a and with the build valve 150a also in a closed (no flow) condition, fluid pressure within the skidding wheel's brake cylinder cannot increase or decrease and is maintained or held at the level of brake pressure sufficient to permit the wheel to reaccelerate. After the previously skidding wheel has accelerated sufficiently, the ECU generates another control signal to the build valve 150a thereby opening (flow) same to communicate the output of the differential pressure regulator 70a to the skidding wheel's brake cylinder through the isolation valve 90a thereby increasing the brake pressure to controllably slow the rotational speed of the wheel. The rate of change of this reapplied brake pressure is controlled through an orifice 154a formed within the build valve 150a as well as by duty-cycle modulation of the valve. Depending upon the control philosophy used by the ECU 40, the build valve 150a may be maintained opened (flow) or alternatively may be pulsed between open and closed conditions to permit the brake pressure to gradually increase If the reapplied brake pressure communicated through the build valve 150a is sufficient to cause the previously skidding wheel to again enter into a skid condition the ECU terminates the control signal to the build valve thereby prohibiting additional buildup of pressure, and essentially simultaneously reactivates the decay valve thereby decreasing the brake line pressure. The above functions of decay, hold and build of the brake pressure are continued until the previously skidding wheel has been brought under control. The operation of the traction control portion of FIG. 2 is similar to that of FIG. 1. As before the pump pressure is communicated throught the solenoid valve 120 and to the check valves 128. The build and decay valves 150b and 152b of the slower rotating wheel remain non-activated to prevent brake pressure build-up. To slow the motion of the higher rotating driven wheel e.g. 18a, the build valve 150a is activated by the ECU 40 thereby communicating the pump 50 to its brake cylinder 62a through the isolation valve 90a slowing same. Further the level of pressure can be controlled by also activating the decay valve 152a.

Figure 3:
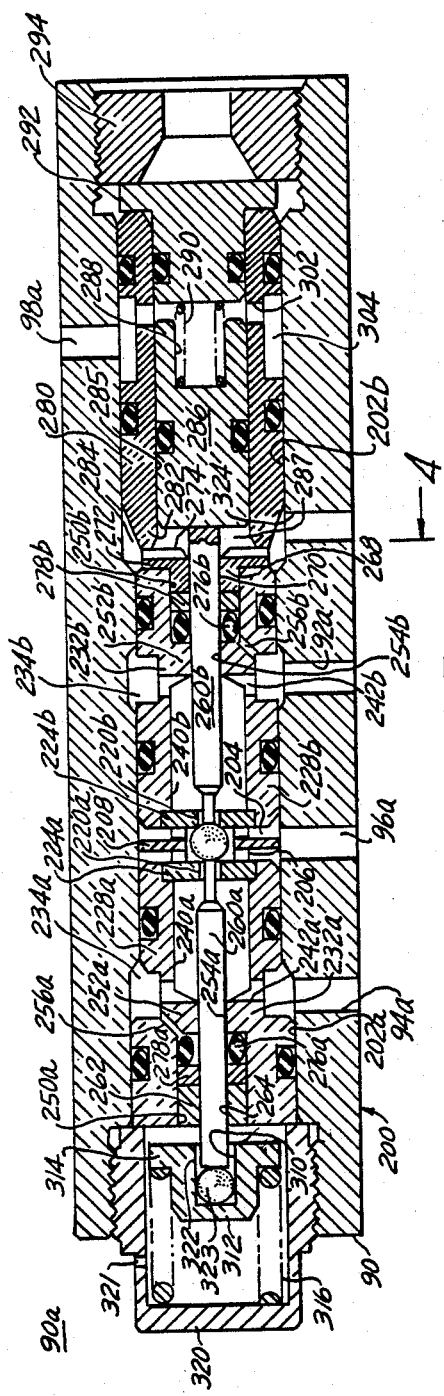
FIG. 3 shows a detailed view of one of the isolation valve of FIG. 1.

FIG. 3 illustrates a detailed cross-section of one of the isolation valves. The isolation valves 90a and b are identical. The isolation valve 90a includes a housing 200 having a stepped bores 202a and 202b therethrough. Situated proximate the middle of the valve is the port 96a which is adapted to communicate with certain of brake cylinders 62. The port 96a terminates within the housing at annular passage 204. Situated within the passage is a ball 206 supported within a ball cage 208. The ball 206 is axially movable to selectively close a first 220a and a second passage 220b. The first and second passages are formed within opposingly spaced valve seats 224a and 224b. Each valve seat is received within an insert 228a and 228b.

Figure 4:
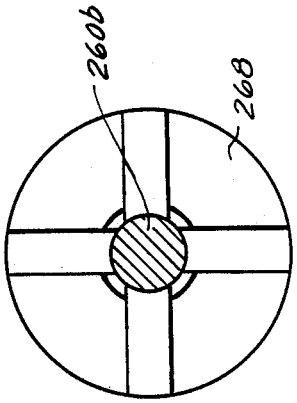
FIG. 4 is a cross-sectional view taken through section 4—4 of FIG. 3.

Each insert is substantially identical and includes a necked-down portion 232a, 232b which form in cooperation with the housing 200 fluid annuli 234a and 234b. A port such as port 94a communicates the annulus 234a with a chamber of the master cylinder 22. Another port such as port 92a communicates the annulus 234b with a solenoid valve such as valves 80, 150 or 152. The inserts 228a and b include first bores 240a, 240b respectively, which receive at one end thereof the valve seats 224a or 224b. The other end of each insert includes a cross-hole 242a or 242b to communicate the first bores 240a,240b with its respective annuli 234a or 234b. Oppositely positioned from each first bore 240 is a second bore 250a,250b. Each first and second bore is separated by a member 252a,252b which radially extends inwardly and terminates at an opening 254a,254b. A pressure equalization passage 256a,256b connects each second bore 250a, 250b with its corresponding annulus 234a,234b. Extending through each insert is a rod 260a or 260b which extends through the passage 220a or 220b to selectively bias the ball 206 against the passages 200a or 220b closing same. The rod 260a is radially stabilized by an O-ring retainer 262 having an opening 264. The retainer 262 also functions as a guide for the rod 260a. Received within the second bore 250b of the insert 228b is a rod guide 268. The rod guide 268 includes a narrow opening 270 through which the rod 260b extends. The rod guide 268 terminates at a flanged end 272 having cross-slots 274 formed on a face thereof. The cross-slots 274 are shown in FIG. 4. As mentioned, the O-ring retainer 262 and rod guide 268 are received proximate the outer end of its corresponding second bore 250a,250b. Also received within each second bore 250a, 250b about each rod 260a,260b is an O-ring 276a, 276b and back-up ring 278a, 278b.

Referring again to the rod guide 268 its flanged end terminates short of the walls of the stepped bore 202. Received within the stepped bore 202b is a piston housing 280. The piston housing 280 terminates in a tapered end 282 at the rod guide 268 and forms in cooperation with the bore 202b and guide 268, an outer annulus 284. An inner annulus 287 is also formed between the piston housing 280 and the rod 260b. The piston housing 280 includes a bore 285 for receipt of a piston 286. The piston 286 may be formed integral with or separate from the rod 260b. The piston 286 includes a partial bore 288 for receipt of a spring 290 which biases the piston 286, and rod 260b against the ball 206 thereby urging same in the direction of passage 220a.

The spring 290, piston 286, piston housing 280 are secured within the housing 200 by spring retainer or end cap 292 and the threaded retainer 294.

Formed within the housing 200, proximate the annulus 234b, is the port 92a communicated to the various solenoid valves Also formed within the housing 200 is the supply port 98a which is connected to the pump and a vent port 324 adapted to be communicated to the reservoir 28 for providing a low pressure leakage path. The partial bore 288 of the piston 286 is communicated to the supply port via cross-holes 302 and a groove 304 formed in the piston housing 280.

An end 310 of the rod 260a extends out from the insert 228a and is received within a rod cap 312. The rod cap 312 includes a radial flange 314 for receipt of spring 316. Another end cap 320 secures the rod cap 312, spring 316, rod 260a, etc., in place and may also include an air vent 321.

The spring 316 urges the ball 206 to the right as viewed in FIG. 3, to close off passage 220b. The end 310 of the rod 260a is received within an oversized bore 322 which eliminates misalignment problems between the rod cap 312 and rod 260a. A ball 323 is located in the bore 322 and functions as a seat for the rod 260a.

During non-anti-lock operation, i.e. with pump 50 deactivated, the spring 316 urges the ball 206 off from the passage 220a, thereby providing a flow path from the master cylinder to the brake cylinders through ports 94a and 96a. During periods when the pump 50 is active, pump pressure is supplied to the piston 286 via port 98a, which in turn, causes the piston to urge the ball 206 to close passage 220a, thereby isolating the master cylinder (port 94a) from the brake cylinders. The movement of the ball also opens passage 220b permitting flow to and from the brake cylinders via ports 92a and 96a.

Upon subsequent deactivation of the pump 50, the spring 316 again seats the ball 206 closing passage 220b to allow direct communication between the master cylinder and the brake cylinders i.e. between ports 94a and 96a.

Figure 5:
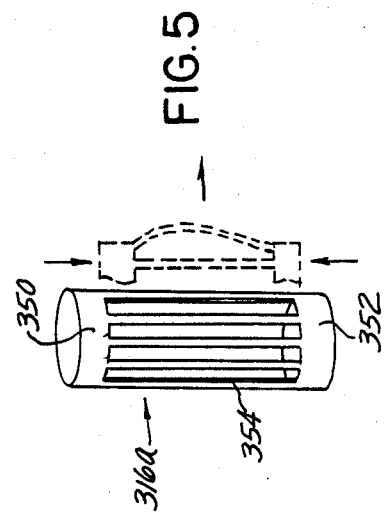
FIG. 5 shows an alternate embodement of a spring used in the isolation valves.

Reference is now made to FIG. 5 which illustrates an alternate embodiment of the invention. More specifically, there is illustrated a spring 316a suitable to replace spring 316. Spring 316 as shown in FIG. 3 may be a linear spring. As such, upon the application of pump pressure to the isolation valve the ball 206 will be moved in a relatively linear manner from passage 220b to passage 220a to isolate the master cylinder as described above. Spring 316a is a snap spring comprising upper and lower members 350 and 352 of a general cylindrical shape. Extending between the upper and lower members about the circumference thereof are a plurality of spaced ribs or fingers 354 which may be formed integrally with members 350 and 352. In operation, the lower member 352 is received about the rod cap 312 and urges same toward the ball 206. The snap spring 316a prohibits the linear movement of the ball toward passage 220a. The snap spring 316a continually urges the ball against passage 220b until the fluid pressure applied to the piston 286 reaches a specified level. At such time the fingers 354 rapidly deform, snap or buckles outwardly permitting the spring 316a to compress. This action permits the ball 206 to transition from passage 220b to passage 220a almost instantaneously.

Many changes and modifications in the above described embodiment of the invention can, of course, be carried out without departing from the scope thereof. Accordingly, that scope is intended to be limited only by the scope of the appended claims.

I claim:

1. A pressure responsive isolation valve for use within an adaptive braking system comprising:
   passage means including a first port adapted to receive pressurized fluid from a brake master cylinder, an outlet port adapted to communicate with a brake cylinder, a second port adapted to be connected to a control valve for receiving pressurized fluid from a pressure source other than the brake master cylinder; and a pressure port remote from the other ports, adapted to receive pressurized fluid from a second pressurized source;
   valve means movable to open and close one or another of opposingly situated first and second passages and to alternatively communicate the first port to the outlet port or the second port to the outlet port;
   means for moving the valve means relative to one or the other of the passages, including first means movable in response to pressurized fluid from the second source for urging the valve means to seat upon the first passage to control communication to and from the brake master cylinder to the output port wherein when the first passage is closed the brake master cylinder is isolated from the brake cylinder, wherein the moving means includes opposingly situated first and second rods, respectively received through the first and second passages and a rod cap positioned about an extending end of the first rod opposite the valve means, the rod cap including a partial bore to loosely receive the extending end, a ball between the cap and the extending end and a first spring for biasing the rod cap in a direction to urge the valve means to close the second passage.

2. The valve as defined in claim 1 wherein the first spring includes a snap spring.

3. A pressure responsive isolation valve for use within an adaptive braking system comprising:

passage means including a first port adapted to receive pressurized fluid from a first pressure source, an outlet port adapted to communicate with various brake cylinders, a second port adapted to communicate fluid to or from control valves; and a pressure port remote from the other ports, adapted to receive pressurized fluid from a second pressurized source;

valve means movable to open and close one or another of opposingly situated first and second passages and to alternatively communicate the first port to the outlet port or the second port to the outlet port thereby isolating the first pressure source from the brake cylinders and further including guide means for radially guiding and supporting the first and second rods;

means for moving the valve means relative to one or the other of the passages, including first means movable in response to pressurized fluid from the second source for urging the valve means to seat upon the first passage to control communication to and from the first source to the output port, wherein said moving means includes opposingly situated first and second rods, respectively received through the first and second passages and wherein the first means includes a piston operatively connected at one end to the second rod and adapted to receive the pressurized fluid from the second source at its other end, wherein the moving means includes a rod cap positioned about an extending end of the first rod opposite the valve means, the rod cap including a partial bore to loosely receive the extending end and a first spring for biasing the rod cap in a direction to urge the valve means to close the second passage, and first guide means comprising a first insert including a necked-down portion having an opening therethrough for receiving the first rod, the necked-down portion separating first and second opposingly situated bores through which the first rod also moves, wherein the first bore is adjacent to the first passage; said passage means further including:

first passage means for communicating the first source with the first bore; said first guide means further including first rod guide means received about the first rod and within an open end of the second bore for radially positioning same, wherein a first seal means is disposed within the second bore of the first insert, about the first rod for sealing such first bore from the second bore of said first insert.

4. The valve as define in claim 3 wherein a first equalization passage is provided in the first insert between its second bore and the first passage means for providing a leakage path therebetween.

5. The valve as defined in claim 4 wherein the guide means further includes second guide means received about the second rod for radially positioning same.

6. The valve as defined in claim 5 wherein said second guide means comprises a second insert including a necked-down portion having an opening therethrough for receiving the second rod, the necked-down portion separating first and second opposingly situated bores through which the second rod also moves, wherein said first bore is adjacent to the second passage, said passage means further including second passage means for communicating the second port with the first bore, said second guide means further including second rod guide means received about the second rod and within an open end of the second bore for radially positioning same.

7. The valve as defined in claim 6 wherein the piston is slidably received with a piston housing.

8. The valve as defined in claim 7 wherein one end of the piston housing, proximate the second rod means forms in cooperation with the second rod guide means, the second rod and the piston, an inner annulus and also forms in cooperation with the rod guide means, an outer annulus;

the second rod guide means further including a plurality of grooves on an extending face thereof for communicating the inner and outer annuli.

9. The valve as defined in claim 8 wherein said passage means includes a vent port in communication with the outer annulus for communicating same to a low pressure reservoir.

10. The valve as defined in claim 9 wherein a second seal means is disposed within the second bore of the second insert, about the second rod for sealing such first and second bore of the second insert.

11. The valve as defined in claim 9 wherein a second equalization passage is provided in the second insert between its second bore and the second passage means for providing a leakage path therebetween.

12. The valve as defined in claim 11 wherein the first spring includes a snap spring.

13. The valve as defined in claim 12 wherein the snap spring includes upper and lower shaped hollow members and a plurality of thin ribs joining same, the fingers operative to maintain the upper and lower members at a fixed distance and being rapidly deformable in response to a specified force applied to one of the upper or lower members to reduce the distance therebetween.

14. The valve as defined in claim 4 wherein a second spring is received upon a portion of the piston for urging same in the direction of the first passage.

* * * * *